United States Patent
Patana et al.

(10) Patent No.: US 11,571,626 B2
(45) Date of Patent: Feb. 7, 2023

(54) SOFTWARE OWNERSHIP VALIDATION OF OPTICAL DISCS USING SECONDARY DEVICE

(71) Applicant: Microsoft Technology Licensing, LLC, Redmond, WA (US)

(72) Inventors: Tero J. Patana, Kirkland, WA (US); Shuoqi S. Wang, Richmond, WA (US); Michael P. Duggan, Duval, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/087,264

(22) Filed: Nov. 2, 2020

(65) Prior Publication Data

US 2022/0134235 A1 May 5, 2022

(51) Int. Cl.
*A63F 13/73* (2014.01)
*A63F 13/71* (2014.01)
*A63F 13/79* (2014.01)
*G06F 21/12* (2013.01)
*G06F 21/34* (2013.01)

(52) U.S. Cl.
CPC .............. *A63F 13/71* (2014.09); *A63F 13/73* (2014.09); *A63F 13/79* (2014.09); *G06F 21/12* (2013.01); *G06F 21/34* (2013.01); *A63F 2300/207* (2013.01); *G06F 2221/0704* (2013.01)

(58) Field of Classification Search
CPC ....................................................... A63F 13/73
See application file for complete search history.

(56) References Cited

U.S. PATENT DOCUMENTS

| 8,769,627 | B1 | 7/2014 | Guo et al. |
| 8,888,600 | B2 | 11/2014 | Nguyen et al. |
| 2001/0029205 | A1 | 10/2001 | Taho et al. |

(Continued)

FOREIGN PATENT DOCUMENTS

| EP | 3637739 A1 | 4/2020 |
| WO | 2007011842 A2 | 1/2007 |

OTHER PUBLICATIONS

Murnane, Kevin, "How to Transfer Data Between Any Two PS4s", Retrieved from: https://www.forbes.com/sites/kevinmurnane/2017/06/22/how-to-transfer-data-between-any-two-ps4s/#2803f6a3429f, Jun. 22, 2017, 13 Pages.

(Continued)

*Primary Examiner* — Jay Trent Liddle
(74) *Attorney, Agent, or Firm* — Ray Quinney & Nebeker P.C.; John O. Carpenter

(57) ABSTRACT

Examples of the present disclosure describe systems and methods for providing software ownership validation of optical discs using secondary devices. In aspects, a user may request access to electronic content using a first device. In response to the request, a local network comprising the first device may be queried to identify a second device having access to the electronic content. For example, the second device may comprise an optical disc comprising the electronic content. Upon identifying the second device, the second device may be queried to determine whether the second device is able to validate the user's ownership of the electronic content. If the second device is able to validate the user's ownership of the electronic content, the first device is provided access to the electronic content.

20 Claims, 8 Drawing Sheets

(56) References Cited

U.S. PATENT DOCUMENTS

| | | |
|---|---|---|
| 2002/0045484 A1 | 4/2002 | Eck et al. |
| 2007/0129150 A1 | 6/2007 | Crowder et al. |
| 2007/0232394 A1* | 10/2007 | Gazdic .................... A63F 13/73 463/29 |
| 2007/0293319 A1 | 12/2007 | Stamper et al. |
| 2010/0227681 A1* | 9/2010 | Soemo .................... G06F 21/10 463/43 |
| 2010/0228984 A1* | 9/2010 | Soemo ............. G11B 20/00862 713/176 |
| 2011/0112895 A1* | 5/2011 | Snyder .................... G06Q 10/10 709/205 |
| 2012/0030366 A1* | 2/2012 | Collart .................... G11B 27/34 709/229 |
| 2012/0088585 A1* | 4/2012 | Harris ...................... A63F 13/02 463/42 |
| 2014/0089515 A1* | 3/2014 | Collart .................... G06F 16/40 709/229 |
| 2014/0201164 A1* | 7/2014 | Skinder ................. G06F 16/957 707/687 |
| 2015/0141120 A1* | 5/2015 | Gordon .................. H04L 67/10 463/31 |
| 2015/0231511 A1 | 8/2015 | Kondo et al. |
| 2015/0332233 A1 | 11/2015 | Hurni et al. |
| 2017/0232348 A1* | 8/2017 | Williams ................ A63F 13/58 463/31 |
| 2019/0060743 A1 | 2/2019 | Leyland et al. |

OTHER PUBLICATIONS

"International Search Report and Written Opinion Issued in PCT Application No. PCT/US2021/053450", dated Jan. 28, 2022, 12 Pages.

* cited by examiner

SOFTWARE OWNERSHIP VALIDATION OF OPTICAL DISCS USING SECONDARY DEVICE

BACKGROUND

Traditionally, video gaming consoles have used optical media to deliver gaming content to players. For example, an optical disc comprising the gaming content is inserted into and executed by an optical disc drive of the gaming console. Many current gaming consoles, however, are being constructed without optical disc drives. As a result, players using gaming consoles without optical disc drives are unable to play their previously acquired optical discs on the current gaming consoles.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for providing software ownership validation of optical discs using secondary devices. In aspects, a user may request access to electronic content using a first device. In response to the request, a local network comprising the first device may be queried to identify a second device having access to the electronic content. For example, the second device may comprise an optical disc comprising the electronic content. Upon identifying the second device, the second device may be queried to determine whether the second device is able to validate the user's ownership of the electronic content. If the second device is able to validate the user's ownership of the electronic content, the first device is provided access to the electronic content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
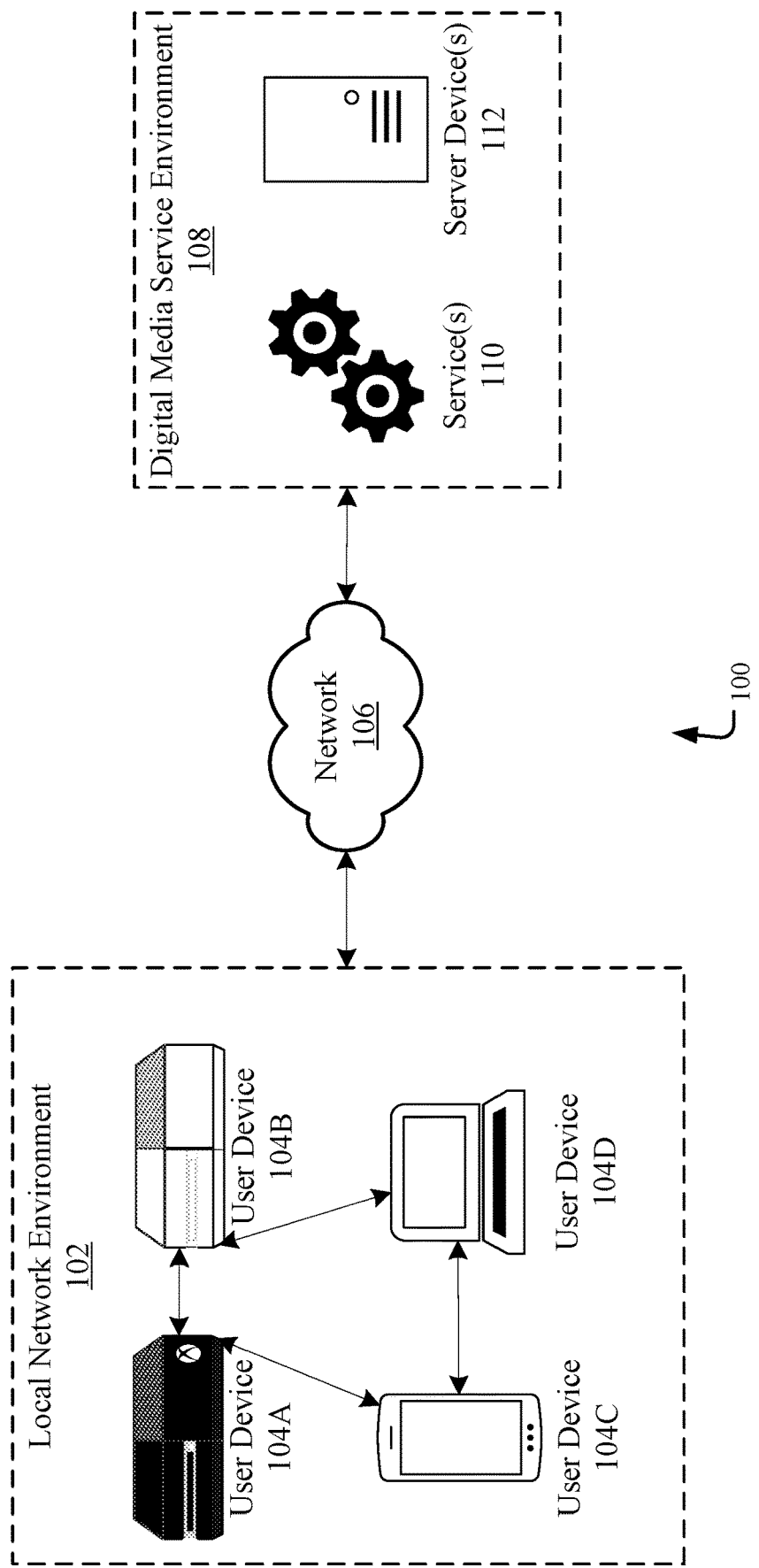
FIG. 1 illustrates an overview of an example system for providing software ownership validation of optical discs using secondary devices as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Traditionally, most personal video game devices (e.g., video game consoles, portable video game devices, personal computers (PCs)) have comprised hardware components, such as optical disc drives, magnetic disk drives, memory card readers, cartridge readers, etc. These hardware components are configured to receive various types of physical video game media (and other types of media), such as optical discs, memory cards, floppy disks, cartridges, etc. In many cases, the video game device owners have amassed extensive libraries of physical video game media and other video game paraphernalia over time. Often, these libraries of physical video game media and paraphernalia represent a significant financial (and emotional) investment for the video game device owners.

In recent years, a trend towards producing and consuming digital video game content has developed. As a result of this trend, many people now prefer digital video game content over physical video game media. Accordingly, many next generation video game devices being developed are configured without hardware components for playing physical video game media. Consequently, when an owner of a previous generation video game device purchases a next generation video game device, the owner is unable to play their physical video game media on the next generation video game device. Instead, the owner must repurchase the digital version of the video game content for the next generation video game device. This scenario is undesirable for multiple reasons. First, video game content (physical and digital) represents a significant financial investment to some people. Although the digital version of the video game content for the next generation video game device may provide additional content and/or significant technological improvements, it may be difficult for some people to justify repurchasing a video game they already own and have already played or completed. Second, many owners of physical video game media have emotional attachments to their physical video game media. These owners simply appreciate the "feel" of handling the physical video game media and/or the nostalgia associated with the physical video game media. Moreover, many of these owners view their libraries of physical video game media and paraphernalia as valuable collections, similarly to rare coins collections, baseball cards collections, etc.

To address such challenges with playing previous generation physical video game media on next generation digital video game devices, the present disclosure describes systems and methods for providing software ownership validation of optical discs using secondary devices. In aspects, a local network may comprise at least a first and second device. For instance, the first and second device may be connected to a local area network (LAN) that is accessible by one or more users. Alternately, the first and second device may not be connected to the same local network. For instance, the first device may be connected to a first local network and the second device may be connected to a second local network. The first and second device may communicate using the Internet or a distributed network system. The first and second device may be accessible via a common user account, separate user accounts of a common user, or separate user accounts of separate users. In examples, the first device may be a next generation video game device that is configured without an optical disc drive and the second device may be a previous generation video game device that is configured with an optical disc drive (or configured with a similar physical media reading component). In other examples, the first and second device may both be next generation devices, previous generation devices, or some combination thereof. Additionally, the first and second device may both be configured with or without an optical disc drive (or a similar physical media reading component). Physical media, such as an optical disc, may be inserted into the optical disc drive of the second device. The second device may be authorized to access electronic content, such as video game content, on the physical media. The second device may also be configured with a selectable setting or option that enables the second device to validate user ownership of the electronic content on the physical media. For example, when the setting or option is enabled, the second device may be able to verify to a separate device, such as the first device, that a specific user or user account possesses ownership of the electronic content on the physical media.

In aspects, a user of the first device may request access to the electronic content on the physical media (or a version thereof). For instance, using an interface of the first device, the user may select an option requesting that the first device be provided access to the electronic content. In some examples, in response to the request, the first device may form and/or execute a query (or cause another device in the local network to from and/or execute a query) configured to search the local network for devices that may validate the user's ownership of the electronic content. The local network query may determine that a device within the local network, such as the second device, may validate the user's ownership of the electronic content. The determination may include evaluating properties of the physical video game media inserted into the second device, configuration settings of the second device, or a user profile of the user. Upon identifying a device capable of validating the user's ownership of the electronic content, the identified device may provide the validation to one or more other devices in the local network. For instance, upon determining that the second device comprises an enabled option or setting that allows the second device to validate user ownership of the electronic content, the second device may provide the validation of user ownership to the first device.

In other examples, in response to the request, the first device may provide an indication of the request to a device or service that is external to the local network, such as an external video gaming service associated with the first device and/or the second device. The external device or service may validate the user's ownership of the electronic content or provide an indication of which devices on the local network may validate the user's ownership of the electronic content. For example, a user identifier of a user requesting access to electronic content and/or a device identifier of the first device may be provided to the external device or service. The external device or service may use the received identifier information to identify account information (e.g., account identifier, associated users, associated devices) associated with the user or first device. The external device or service may use the account information to determine whether a user associated with the account information is indicated as having ownership of the electronic content. For instance, the external device or service may search for purchase history information, electronic content registration information, and the like for the user or account name. If the user is indicated as having ownership of the electronic content, the external device or service may provide the validation of user ownership to the first device.

In aspects, upon receiving validation of user ownership of the electronic content, the first device may be provided access to the electronic content. For instance, a digital version of the electronic content may be downloaded or streamed to the first device from the second device or from the external device or service. In examples, the first device's access to the electronic content may be effective while the first device and the second device are on the same local network, while the physical media comprising the electronic content is inserted into the second device, and/or while a digital version of the electronic content is available to the external device or service.

Accordingly, the present disclosure provides a plurality of technical benefits including but not limited to: facilitating access to physical media on next generation devices, facilitating access to physical media on devices lacking physical media reading components, software content ownership validation using local network devices, streaming and/or downloading content from local network devices to prevent/mitigate internet fees and bandwidth issues, sharing software content ownership validation among multiple user devices, and providing options/setting for enabling software content ownership validation on one or more user devices, among other examples.

FIG. 1 illustrates an overview of an example system for providing software ownership validation of optical discs using secondary devices as described herein. Example system 100 as presented is a combination of interdependent components that interact to form an integrated whole. Components of the system may be hardware components or software components implemented on and/or executed by hardware components of the system. In one example, system 100 may provide an operating environment for software components to execute and utilize resources or facilities of system 100. An example of one or more processing devices comprising such an operating environment is depicted in FIGS. 4-7. In another example, the components and/or operating environment(s) of systems disclosed herein may be distributed across multiple devices. For instance, input may be entered on a client device and information may be processed on or accessed from other devices in a network, such as one or more remote cloud or web server devices.

As one example, system 100 may comprise local network environment 102, user devices 104A, 104B, 104C, and 104D (collectively "user devices 104"), network 106, digital media service environment 108, service(s) 110, and service device(s) 112. One of skill in the art will appreciate that the scale of systems such as system 100 may vary and may include additional or fewer components than those described in FIG. 1. For instance, in some examples, one or more of service(s) 110 may be integrated into local network environment 102. In other examples, local network environment 102 may not be limited to a local network. For instance, local network environment 102 may be a wide area network (WAN) or a similar network environment.

In aspects, local network environment 102 may be configured to provide a computer network that interconnects one or more computing devices. In some examples, local network environment 102 may include a local area network (LAN), a personal area network (PAN), and similar networking solutions. In other examples, local network environment 102 may include a WAN, a campus area network (CAN), a metropolitan area network (MAN), a global area network (GAN) or a similar geographically dispersed network solution. Local network environment 102 may comprise user devices 104. Examples of user device 104 may include, but are not limited to, video game devices, personal computers (PCs), mobile devices (e.g., smartphones, tablets, laptops, personal digital assistants (PDAs)), and wearable devices (e.g., smart watches, smart eyewear, fitness trackers, smart clothing, body-mounted devices, head-mounted display (HMD) devices, virtual reality (VR)/augmented reality (AR)/mixed reality (MR) sensor devices). User devices 104 may provide one or more sensors and/or input modalities for receiving or collecting input. Example sensors and/or input modalities may include microphones, touch-based sensors, keyboards, pointing/selection tools, optical/magnetic scanners, accelerometers, magnetometers, gyroscopes, etc. The received/collected input may include, for example, voice input, touch input, text-based input, gesture input, video input, image input, and/or other controller (e.g., gamepad, joystick, keyboard, mouse, and other gaming instruments) input.

In aspects, one or more of user devices 104 may comprise a physical media reading component, such as a storage drive (e.g., optical disc drive, magnetic disk drive), a memory card reader, a cartridge reader, etc. The physical media reading component may be configured to receive one or more types of physical media. Examples of physical media may include optical media (e.g., compact discs (CDs), digital versatile discs (DVDs), Blu-Ray discs (BDs)), magnetic media (e.g., diskettes, floppy disks, zip disks), memory cards (e.g., secure digital (SD) cards, subscriber identify module (SIM) cards, smart cards), media cartridges (e.g., ROM game cartridges), media cassettes, etc. Upon receiving physical media into a physical media reading component, a user device ("disc-based user device") may be configured to provide access to electronic content (e.g., video game data, video data, audio data, text data) on or associated with the physical media. Such access may be provided via one or more user interfaces of the disc-based user device. For example, the disc-based user device may provide a user interface that enables users to interact with the electronic content of the physical media when the physical media is inserted into the disc-based user device. The user interface (s) may further provide a selectable option for enabling validation of physical media registered to or accessed using the disc-based user device. When enabled, the selectable option may inform other devices that the disc-based user device is able to validate physical media currently or previously inserted into the disc-based user device.

In some aspects, one or more of user devices 104 may not comprise a physical media reading component ("discless user device"). Instead, a discless user device may provide an interface for interacting with functionality (e.g., services, applications, digital media) provided by the discless user device. The interface may further enable the discless user device to interact with local network environment 102 and/or the other devices of local network environment 102. For example, the interface may enable the discless user device to request access to electronic content, such as electronic content associated with the physical media inserted into the disc-based user device. Based on such a request, the discless user device may be configured to query (or cause the querying of) local network environment 102 for user devices that are configured to validate a user's ownership of the electronic content. As one example, the discless user device may query local network environment 102 to identify each user device currently connected to local network environment 102. The discless user device may then query one or more of the identified devices to determine whether the respective devices are able to validate a user's ownership of the electronic content. If at least one of the identified devices is able to validate the user's ownership of the electronic content, the validation (or an indication thereof) may be provided to the discless user device.

As another example, the discless user device may provide an indication of the user's intent to access the electronic content to digital media service environment 108 via network 106. Examples of network 106 may include a wide area network (WAN), a campus area network (CAN), a metropolitan area network (MAN), etc. Digital media service environment 108 may be configured to provide one or more applications or services, such as service(s) 110. Examples of service(s) 110 include online gaming services, digital media delivery services, and/or asset ownership validation services. Digital media service environment 108 may comprise or be implemented on one or more computing devices, such as service device(s) 112. Service device(s) 112 may include PCs, server devices, virtual devices, storage devices, and other types of computing devices. Upon receiving the indication of the user's intent to access the electronic content, digital media service environment 108 may identify account information associated with the user and/or the discless user device. Based on the account information, digital media service environment 108 may determine whether the user possesses ownership of the electronic content. If the user is determined to possess ownership of the electronic content, the validation (or an indication thereof) may be provided to the discless user device.

In aspects, the discless user device may use the validation of ownership of the electronic content to access the electronic content. For example, the discless user device may download or stream a digital version of the electronic content from digital media service environment 108 via network 106. As another example, the discless user device may download or stream the electronic content from the disc-based user device via local network environment 102. In such an example, the discless user device may avoid using internet bandwidth and avoid corresponding issues and costs by accessing the electronic content using local network environment 102. In some aspects, the validation of ownership of the electronic content may be provided to other user devices in local network environment 102. For example, the discless user device may provide the validation of ownership (or provide an indication of the validation of ownership) to each user device in local network environment 102. The validation of ownership may enable each device to access the electronic content using local network environment 102. Such access may occur concurrently with other user devices in local network environment 102. Alternately, the electronic content may only be accessible by one user device of local network environment 102 at a time.

Figure 2:
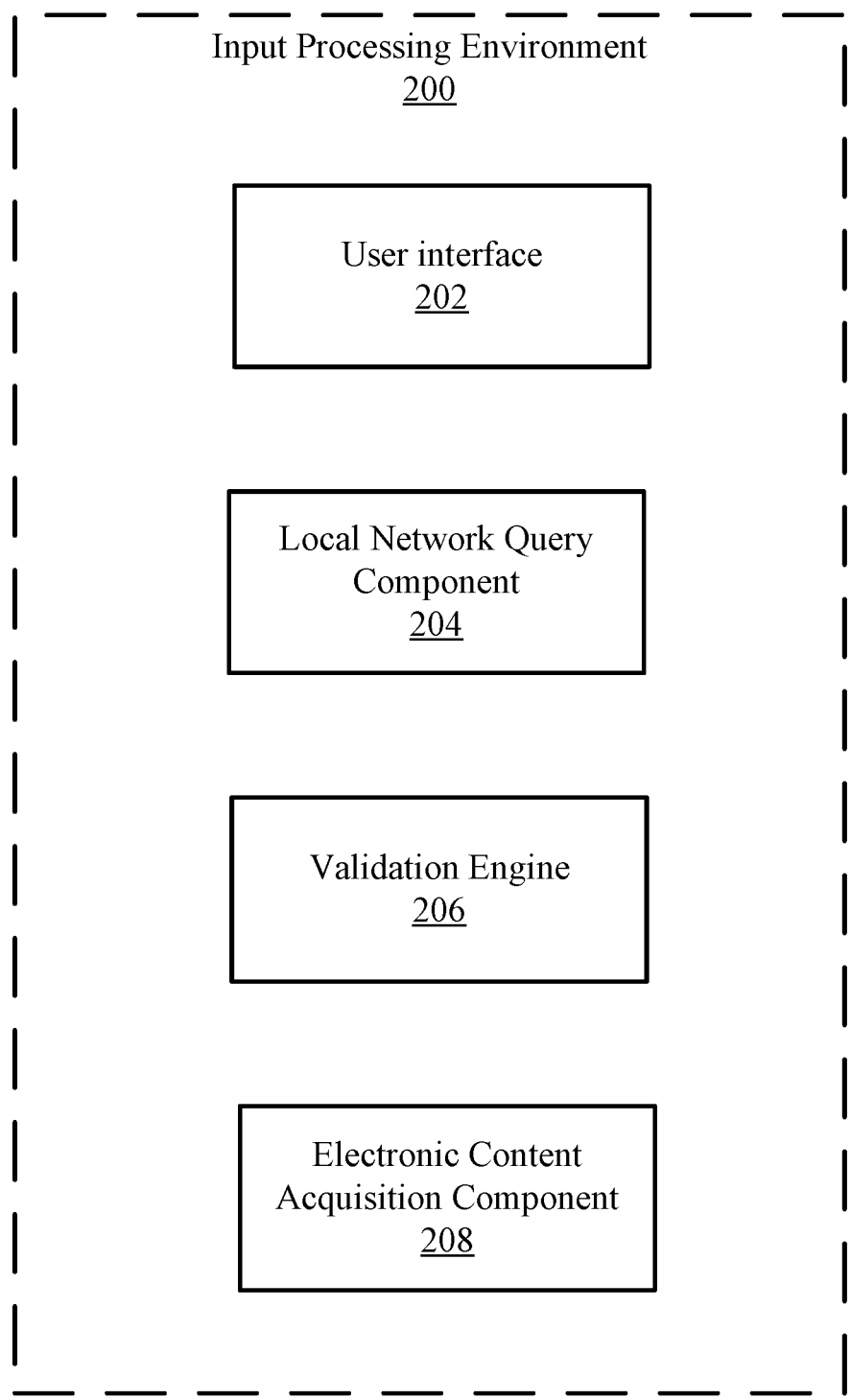
FIG. 2 illustrates an example input processing unit for providing software ownership validation of optical discs using secondary devices as described herein.

FIG. 2 illustrates an example input processing environment for providing software ownership validation of optical discs using secondary devices as described herein. The techniques implemented by input processing environment 200 may comprise the techniques and data described in system 100 of FIG. 1. Although examples in FIG. 2 and subsequent figures will be discussed in the context of video game devices and content, the examples are equally applicable to other contexts, such as video playback devices and content, audio playback devices and content, image viewing devices and content, etc. In some examples, the data and one or more components described in FIG. 2 (or the functionality thereof) may be distributed across multiple devices. In other examples, a single device may comprise the data and components described in FIG. 2.

In aspects, input processing environment 200 may represent a computing device or system that is operable to execute or provide access to various types of electronic content. For instance, input processing environment 200 may be a video gaming device or system that provides access to video gaming content, video content (e.g., movies, videos, images), audio content (e.g., music, sounds, voice data), and/or other types of content. Input processing environment 200 may be implemented in a network comprising other devices. For example, a local network may include other video gaming devices or systems, mobiles device, PCs, and/or wearable devices. Input processing environment 200 and one or more of the other devices of the local network may be associated with a common user or user account. As another example, a remote or distributed network may include devices (e.g., video gaming devices or systems, mobiles device, PCs, and/or wearable devices) of multiple users and/or user accounts. Input processing environment 200 may include or utilize one or more input devices/components (e.g., game controller, keyboard, mouse, track ball, microphone, camera/image capture component, wearable sensors) and/or output devices/components (e.g., monitor, display screen/area, projector, speakers, headphones, haptic components). Input processing environment 200 may or may not also include a physical media reading component, such as an optical disc drive or a memory card reader.

In FIG. 2, input processing environment 200 comprises user interface 202, local network query component 204, validation engine 206, and electronic content acquisition component 208. One of skill in the art will appreciate that the scale of input processing unit 200 may vary and may include additional or fewer components than those described in FIG. 2. For instance, local network query component 204 and/or validation engine 206 may be located remotely to input processing environment 200, such as at a dedicated online or cloud-based video gaming and/or digital media delivery service.

User interface 202 may be configured to display and/or provide access to electronic content. User interface 202 may comprise various user interface elements, such as input controls (e.g., buttons, icons, text fields, dropdown list, radio buttons, checkboxes), navigational components (e.g., search fields, sliders, scroll bars, links), informational components (e.g., progress bars, tooltips, notification areas), etc. The various user interface elements may enable users to request access to electronic content. For example, a user may access a content request menu of user interface 202 to request access to video game content previously purchased, acquired, or accessed by the user. In response to the request, user interface 202 may provide a notification to the user regarding the request. For instance, user interface 202 may display a message indicating that input processing environment 200 is attempting to verify the user's ownership of electronic content and/or to locate the electronic content. User interface 202 may comprise user interface elements for providing the electronic content to the user. For example, user interface 202 may comprise various multimedia components for navigating and/or otherwise interacting with the electronic content.

Local network query component 204 may be configured to generate network queries and/or collect local network data. In aspects, local network query component 204 may be invoked in response to user interaction with user interface 202, although methods for invoking local network query component 204 are not so limited. For example, in response to receiving a request to access electronic content, user interface 202 may invoke local network query component 204. Upon being invoked, local network query component 204 may identify a local network to which input processing environment 200 is connected. In some example, the network may not be a local network, as described above. The identification of the local network may include directly querying devices on the local network, querying a network appliance (e.g., a router, a firewall) having access to the local network, or using other network identification techniques. After identifying a local network of input processing environment 200, local network query component 204 may identify devices connected to the local network using one or more device identification techniques (e.g., network identification commands, internet protocol (IP) scanners). Local network query component 204 may query one or more of the identified devices to determine whether at least one of the identified devices is configured to validate a user's ownership of the electronic content. The determination may include evaluating properties of physical media inserted into an identified device, configuration settings of an identified device, or a user profile of a user associated with an identified device.

Local network query component 204 may be further configured to collect information from a device or service external to the local network. The external device or service may comprise user account information and/or electronic content ownership information for a user or user account associated with input processing environment 200. For example, upon being invoked, local network query component 204 may provide identification information for a user (e.g., user or account identifier) and/or input processing environment 200 (e.g., device/environment identifier or IP address) to the external device or service. In response, the external device or service may provide validation of the user's ownership of the electronic content to local network query component 204. Alternately, the external device or service may provide an indication of which devices on the local network may validate the user's ownership of the electronic content to local network query component 204.

Validation engine 206 may be configured to receive validation of ownership of electronic content. In aspects, validation engine 206 may collect a validation of ownership of electronic content from an identified device on the local network or the external device or service. The validation may be represented as a data object, such as a security key, a token, a certificate, a cookie, etc. Validation engine 206 may store and/or maintain one or more validation data objects for input processing environment 200. For example, validation engine 206 may store a list of current and/or previously collected validation data objects. Validation engine 206 may maintain data (e.g., acquisition information, expiration information, security information, associated users or devices) for each validation data object. In some aspects, validation engine 206 may provide received validation data objects to other devices in the local network. For instance, upon collecting a validation data object from a first device in the local network, validation engine 206 may provide the validation data object to other devices in the local network. The other devices may or may not be associated with a user or user account that is associated with input processing environment 200. As a specific example, validation engine 206 may collect a validation data object from an entertainment device, such as a video gaming system, that is configured with an optical disc drive that includes an optical disc comprising the requested electronic content. Validation engine 206 may provide the validation data object to one or more device or device types connected to the local network. As a result, each of the devices on the local network that receives the validation data object may be able to access the requested electronic content.

Electronic content acquisition component 208 may be configured to provide access to electronic content. In aspects, after ownership of electronic content has been validated and/or received, electronic content acquisition component 208 may request access to requested electronic content. Requesting access to requested electronic content may comprise providing the validation data object (or an indication thereof) to one or more devices. For example, electronic content acquisition component 208 may provide the validation data object to a local network device that is configured with an optical disc drive that includes an optical disc comprising the requested electronic content. In response, the local network device may stream, upload, or otherwise provide access to the requested electronic content (or a version thereof) to input processing environment 200. As another example, electronic content acquisition component 208 may provide the validation data object to an external device or service having access to the requested electronic content. In response, the external device or service may stream, upload, or otherwise provide access to the requested electronic content (or a version thereof) to input processing environment 200. User interface 202 may provide the electronic content received by electronic content acquisition component 208 to a user to satisfy the user request to access the electronic content.

Having described various systems that may be employed by the aspects disclosed herein, this disclosure will now describe one or more methods that may be performed by various aspects of the disclosure. In aspects, method 300 may be executed by a system, such as system 100 of FIG. 1, or an execution environment, such as input processing environment 200 of FIG. 2. However, method 300 is not limited to such examples. In other aspects, method 300 may be performed by one or more components of a distributed network, such as a web service/distributed network service (e.g. cloud service).

Figure 3:
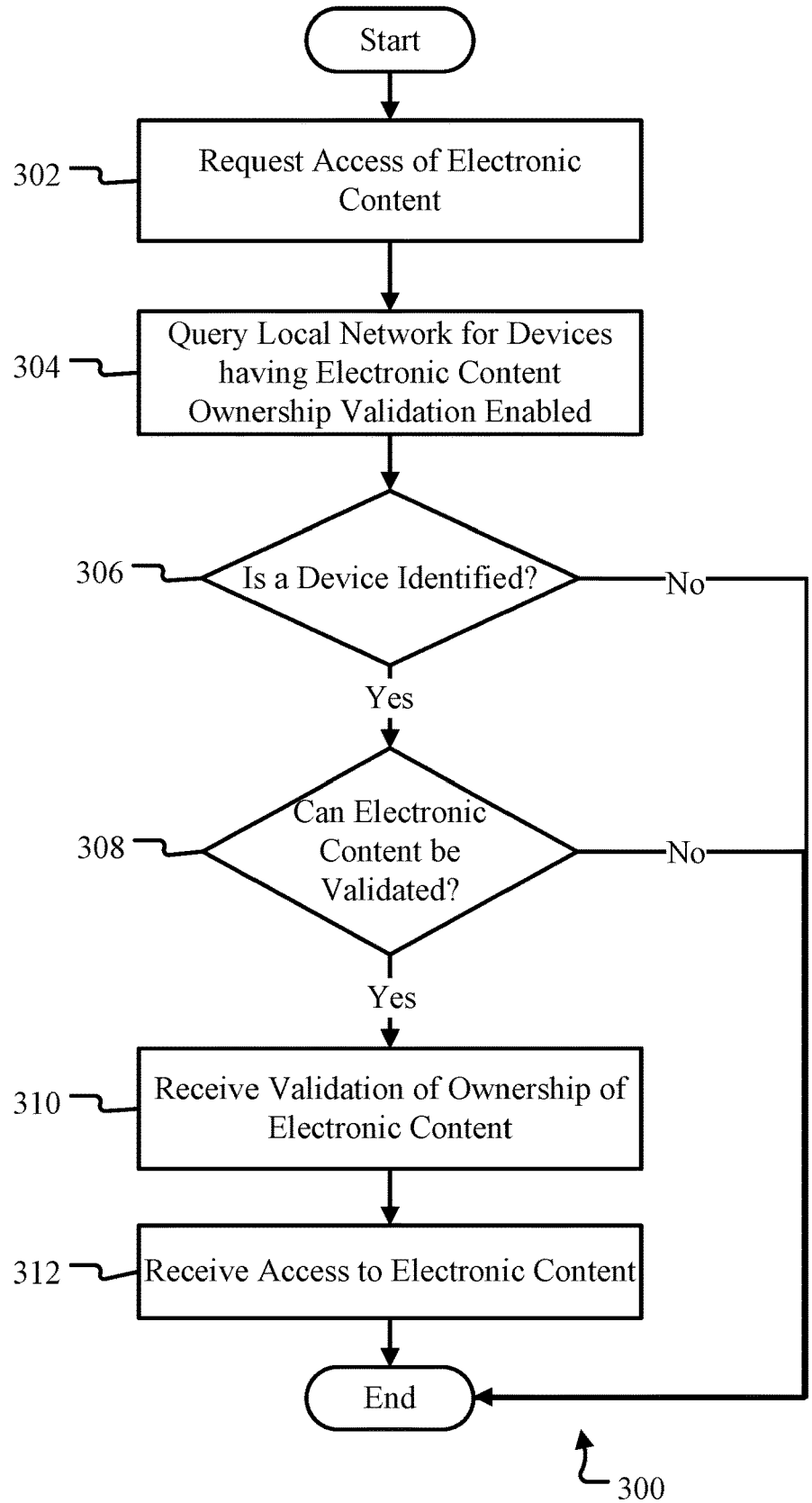
FIG. 3 illustrates an example method for providing software ownership validation of optical discs using secondary devices as described herein.

FIG. 3 illustrates an example method for providing software ownership validation of optical discs using secondary devices. In the method, a first device, such as input processing environment 200, and one or more secondary devices may be connected to a common network, such as local network 102. The first device may be an entertainment device that is configured without a hardware component into which physical media is intended to be inserted. Alternately, the first device may be configured with such a hardware component. A second device of the secondary devices may be an entertainment device that is configured with a hardware component into which physical media is intended to be inserted. The hardware component of the second device may comprise physical media comprising electronic content. The second device may also be configured with a setting or option that, when enabled, allows the second device to validate user ownership of the electronic content on the physical media.

Example method 300 begins at operation 302, where a request to access electronic content is received. In aspects, the first device may receive a user request to access electronic content. The request may be received via a user interface, such as user interface 202, provided by the first device. Upon receiving the request, the first device may not have access to the electronic content. For example, a user of a first entertainment device may request access to electronic content stored on an optical disc that is currently inserted into the optical disc drive of a second entertainment device. Because the first entertainment device is not configured with an optical disc drive (or an alternate means for reading the optical disc), the first entertainment device may not have access to the electronic content stored on the optical disc. In an alternate example, a user of an entertainment device may request access to electronic content stored on physical media that is currently inserted into the physical media reading component of the entertainment device. However, the physical media reading component of the entertainment device may be unable to read/interpret the format or version of the physical media.

At operation 304, the local network may be queried to identify devices capable of validating ownership of the electronic content. In aspects, in response to receiving the request to access the electronic content, the first device may generate a network query using a query component, such as local network query component 204. The network query may be configured to identify local network devices having specific attributes, capabilities, or configuration settings. For example, the network query may be configured to identify devices capable of validating ownership of the electronic content. Identifying such devices may include querying the devices for an enabled ownership validation option or setting, listening for/receiving broadcast messages from devices that indicate an enabled ownership validation option or setting, evaluating previous validation data associated with the first and/or second device, etc. The network query may cause a list of one or more candidate validation devices to be generated.

At decision 306, the list of candidate validation devices (e.g., devices capable of validating ownership of the electronic content) may be evaluated. If no devices are indicated by the list of candidate validation devices, the request to access the electronic content cannot be fulfilled and method 300 ends. However, if one or more devices are indicated by the list of candidate validation devices, method 300 proceeds to decision 308.

At decision 308, one or more candidate devices on the list of candidate validation devices may be evaluated to determine whether the candidate device is able to validate ownership of the electronic content at the present time. The determination may comprise identifying whether the candidate device is currently accessible, identifying whether physical media comprising the electronic content is currently inserted into the candidate device, identifying whether the electronic content is currently accessible (e.g., readable or valid), etc. If no device on the list of candidate validation devices is determined to be able to validate ownership of the electronic content at the present time, the request to access the electronic content cannot be fulfilled and method 300 ends. However, if a candidate device is determined to be able to validate ownership of the electronic content at the present time, method 300 proceeds to operation 310.

At operation 310, validation of ownership of the electronic content may be received. In aspects, an ownership validation component, such as validation engine 206, may receive a validation data object from the candidate device determined to be able to validate ownership of the electronic content ("the second device"). The ownership validation component may share the validation data object with one or more of the secondary devices connected to the local network. The validation data object may be represented as a security key, a token, a certificate, a cookie, etc. The validation data object may enable the first device and/or the secondary devices to access the electronic content. In examples, the validation data object may define or be subject to one or more criteria. For instance, the validation data object may be effective for a specified time period (e.g., one day, for the duration of a user account membership, indefinitely), or while certain conditions exist (e.g., while the first device and the second device remain on the same local network, while the physical media remains in the second device, while a digital version of the electronic content remains available). When a validation data object is no longer effective, the ownership validation component may store, discard, and/or attempt to renew the validation data object for one or more devices. For example, when the validation data object expires due to time lapse, the ownership validation component may request a time extension or a new validation data object from the second device. Alternately, the ownership validation component may request a time extension or a new validation data object from an alternate device.

At operation 312, access to the electronic content may be received. In some aspects, a content acquisition component, such as electronic content acquisition component 208, may provide the validation data object to the second device. In response to receiving the validation data object, the second device may stream, upload, or otherwise provide access to the electronic content (or a version thereof) to the first device. In other aspects, the content acquisition component may provide the validation data object to a device or service external to the local network. The external device or service may possess access to the electronic content (or a version thereof). For example, the external device or service may be a gaming and digital media delivery service that possesses access to a digital version of the requested electronic content. The external device or service may stream, upload, or otherwise provide access to digital version of the requested electronic content to the first device.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
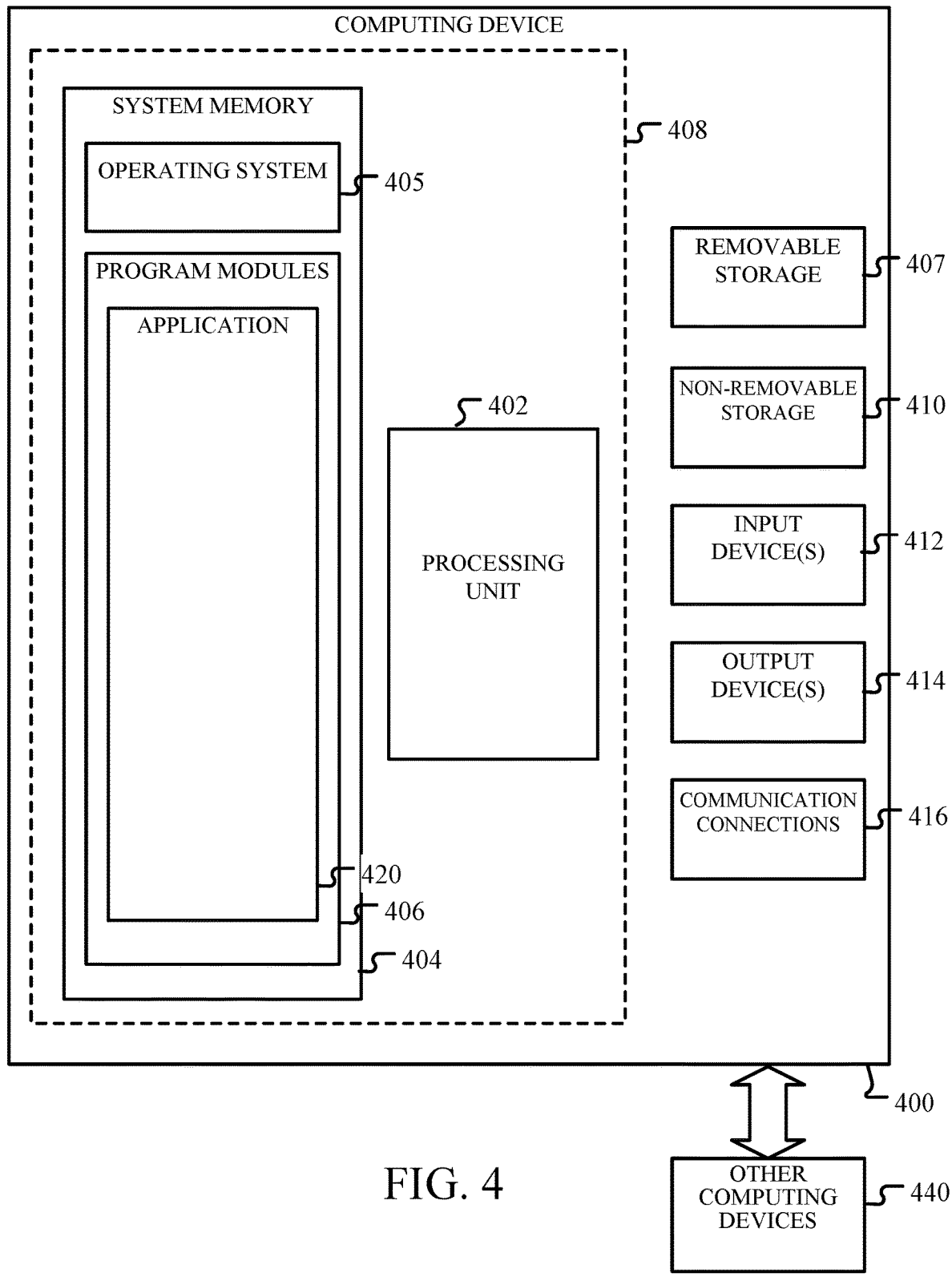
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical discs, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile discs (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
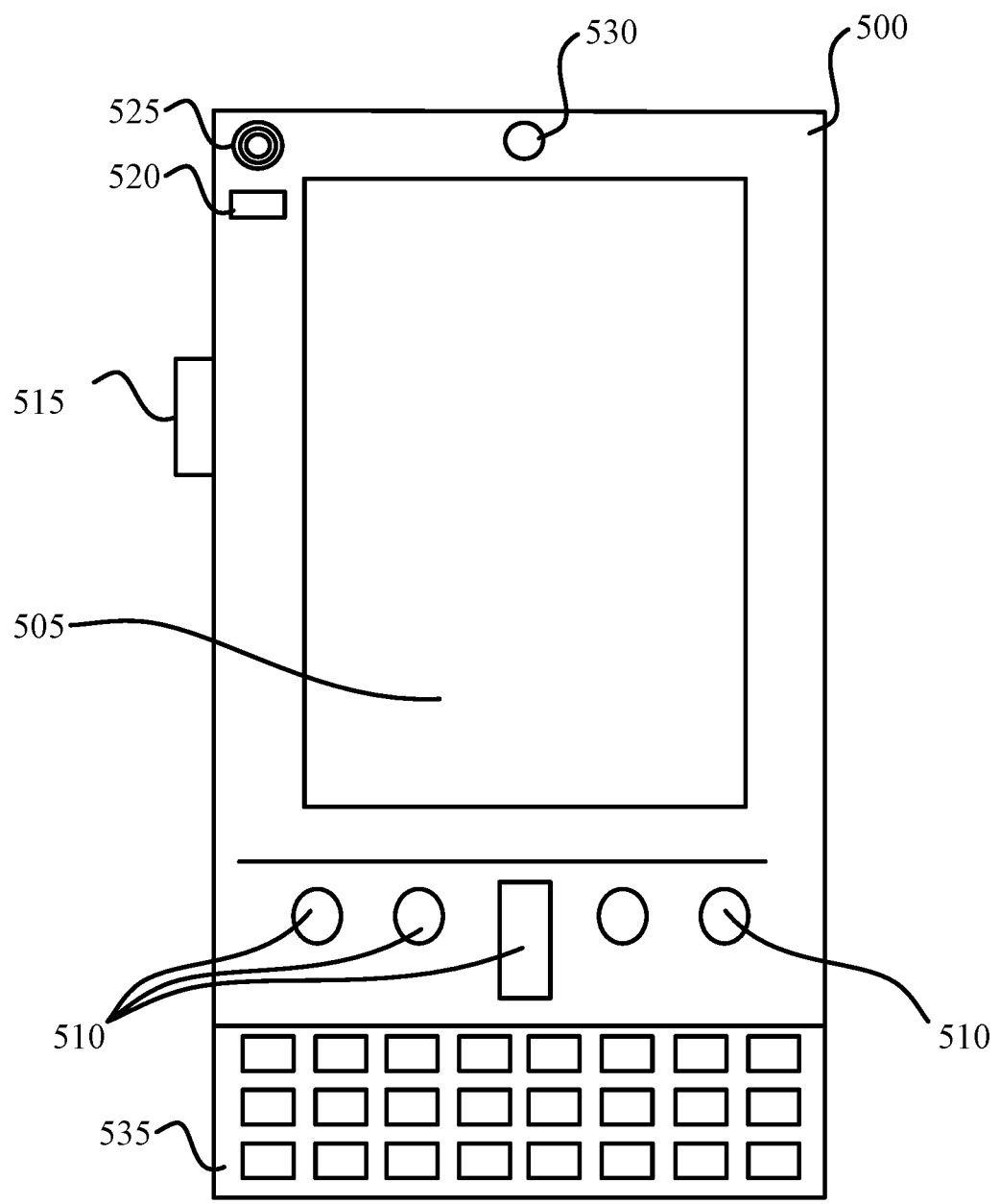
FIGS. 5A and 5B are simplified block diagrams of a mobile computing device with which aspects of the present disclosure may be practiced.
Figure 5B:
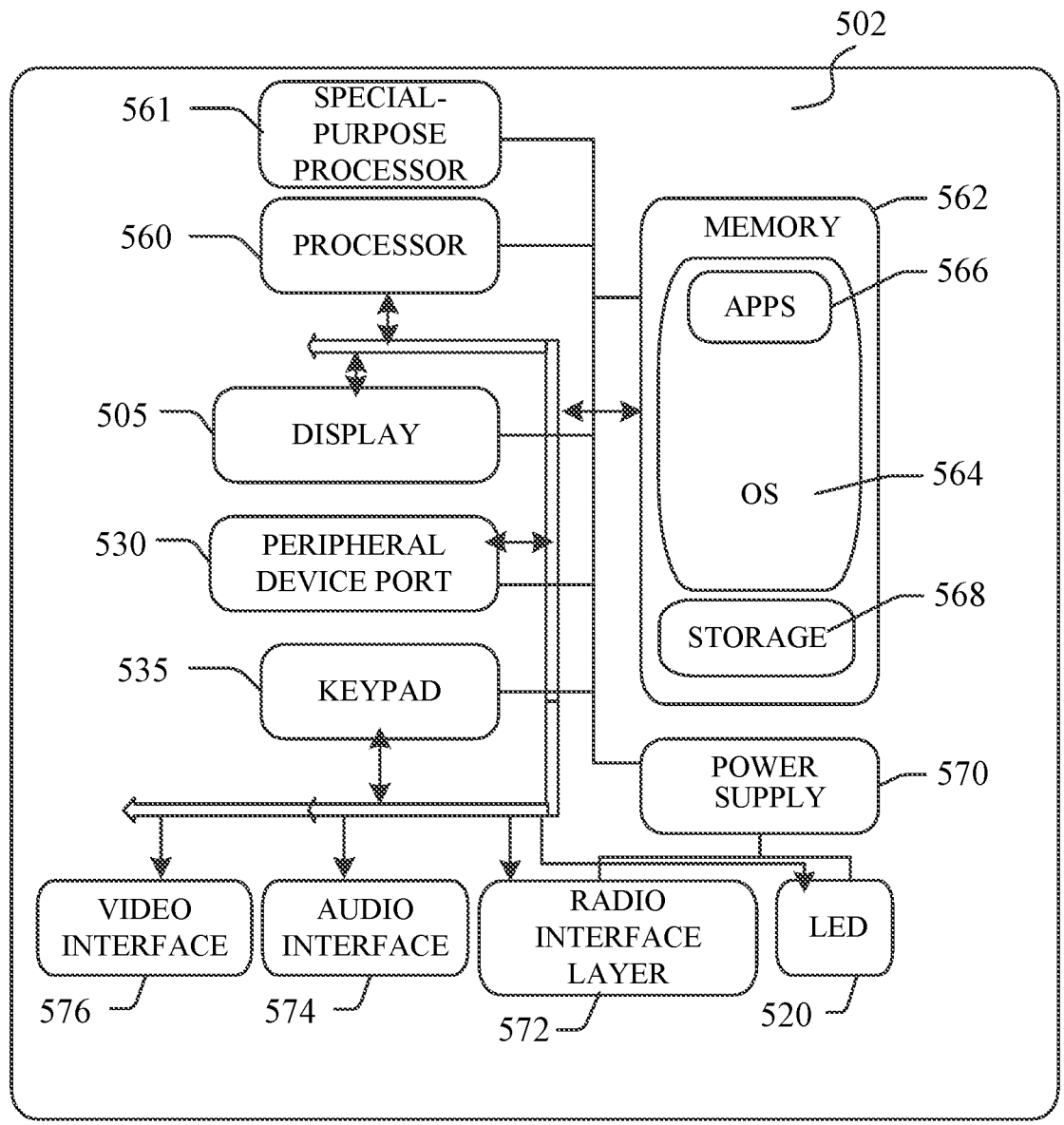

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display).

If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical discs, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
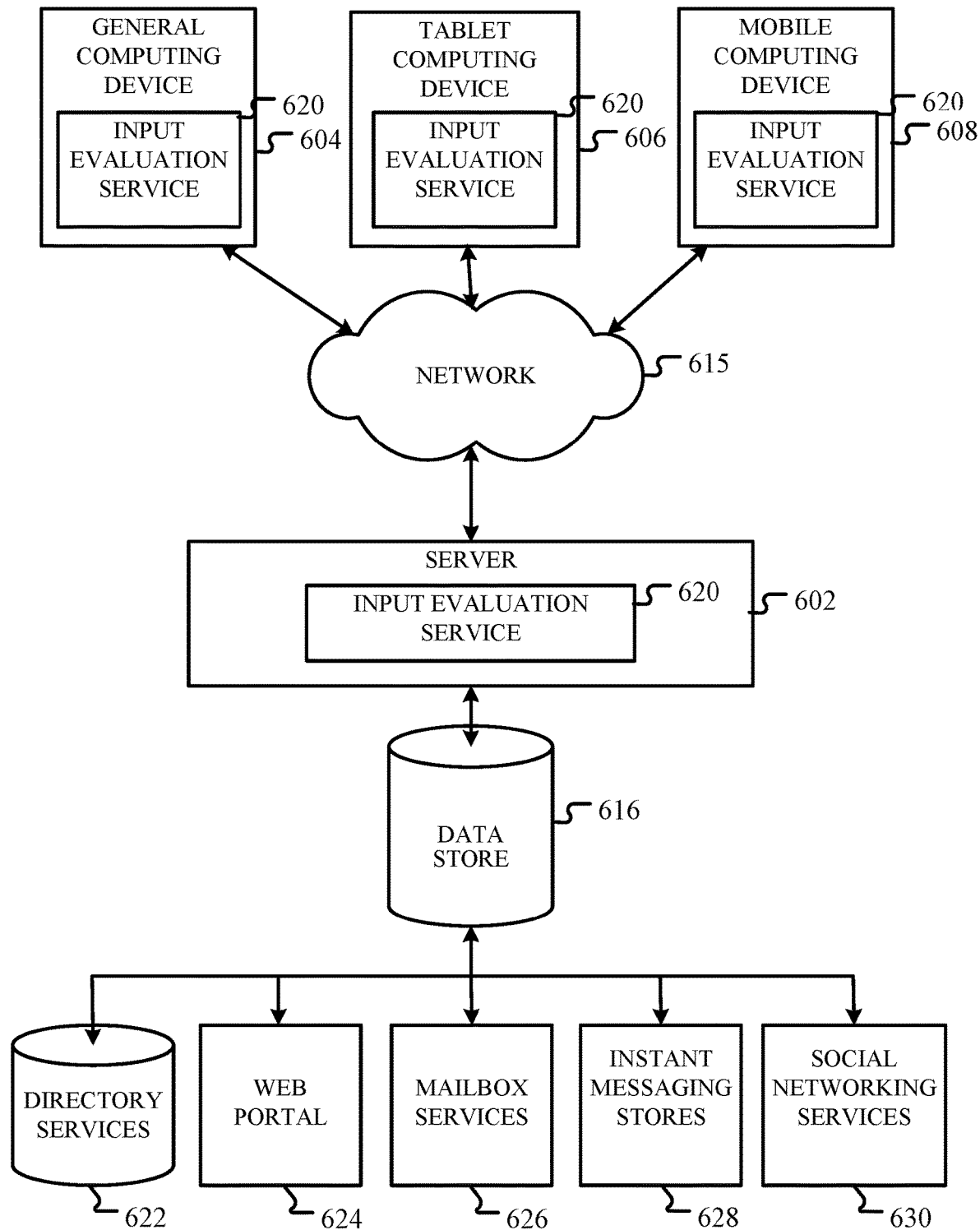
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

An input evaluation service 620 may be employed by a client that communicates with server device 602, and/or input evaluation service 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
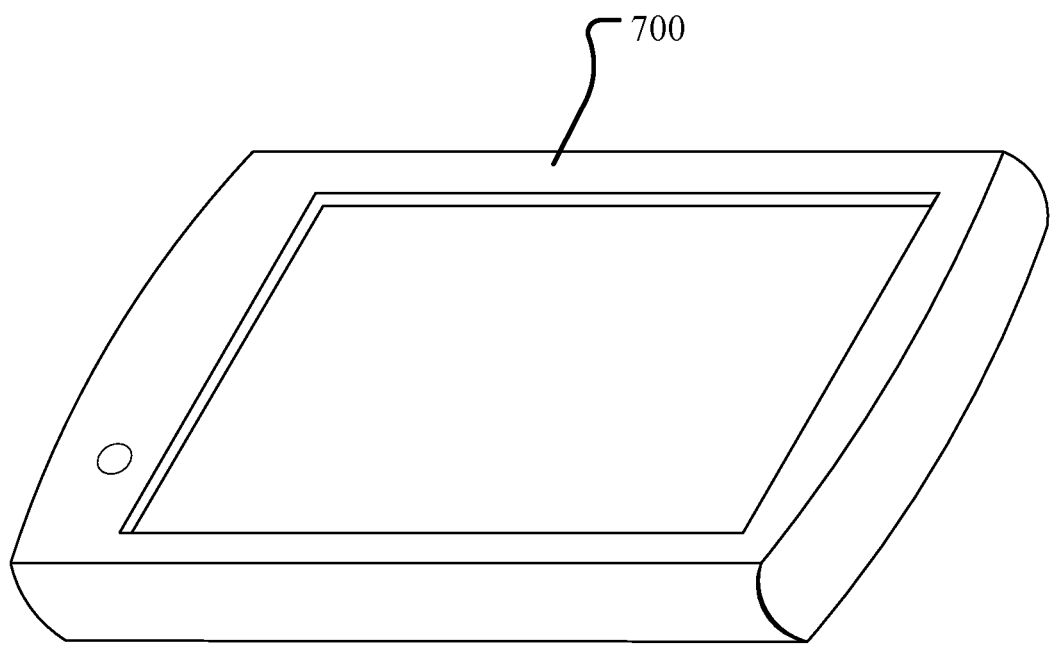
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a processor; and
   memory coupled to the processor, the memory comprising computer executable instructions that, when executed by the processor, perform a method comprising:
      requesting, by a first device, access to electronic content associated with physical media, wherein the physical media is not comprised by the first device;
      querying a local network of the first device to identify a second device on the local network capable of validating ownership of the electronic content;
      receiving, at the first device and from the second device via the local network, a validation data object of the ownership of the electronic content; and using, by the first device, the validation data object to access the electronic content.

2. The system of claim 1, wherein the first device does not comprise a physical media reading component configured to receive physical media.

3. The system of claim 1, wherein the second device comprises a physical media reading component configured to receive physical media.

4. The system of claim 3, wherein the physical media reading component comprises the physical media and the physical media comprises the electronic content.

5. The system of claim 3, wherein the physical media reading component is an optical disc drive and the physical media is an optical disc.

6. The system of claim 1, wherein identifying the second device comprises determining the second device comprises an enabled setting or option for validating the ownership of the electronic content.

7. The system of claim 6, wherein determining the second device comprises the enabled setting or option comprises at least one of:
   querying, by the first device, the second device;
   receiving, by the first device, a broadcast message from the second device; and
   evaluating previous validation data associated with the first device or the second device.

8. The system of claim 1, wherein identifying the second device comprises at least one of:
   identifying whether the second device is currently accessible;
   identifying whether the physical media is currently inserted into the second device; or
   identifying whether the electronic content is currently accessible.

9. The system of claim 1, wherein the validation data object defines a time period the validation data object is effective.

10. The system of claim 1, wherein the validation data object is effective while:
    the first device and the second device remain on the local network; and
    the second device comprises the physical media.

11. The system of claim 1, wherein the computer executable instructions that, when executed by the processor, perform the method further comprising:
    providing the validation data object to a third device connected to the local network; and
    accessing, by the first device, the electronic content concurrently with the third device.

12. The system of claim 1, wherein using the validation data object to access the electronic content comprises providing the validation data object to the second device.

13. The system of claim 1, wherein accessing the electronic content comprises receiving, by the first device, at least one of:
    streaming data of the electronic content; or
    a download of the electronic content.

14. The system of claim 13, wherein the electronic content is received from at least one of:
    the second device; or
    an external service associated with the second device, wherein the external service is external to the local network and a user of the second device possesses an account with the external service.

15. The system of claim 1, wherein the first device and the second device are associated with a common user account; and
    wherein the validation data object is based at least in part on the common user account.

16. A method comprising:
    requesting, by a first device, access to electronic content associated with physical media, wherein the physical media is not comprised by the first device;
    querying a local network of the first device to identify a second device on the local network capable of validating ownership of the electronic content, wherein the second device comprises the physical media;
    receiving, at the first device and from the second device via the local network, a validation data object, wherein the validation data object provides validation of ownership of the electronic content; and
    using, by the first device, the validation data object to access the electronic content.

17. The method of claim 16, wherein accessing the electronic content comprises receiving, by the first device, a digital version of the physical media.

18. The method of claim 16, wherein the first device is a first video gaming device and the second device is a second video gaming device.

19. The method of claim 16, wherein the physical media is at least one of:
    an optical disc;
    a game cartridge; or
    a memory card.

20. A first video gaming device comprising:
    a processor; and
    memory coupled to the processor, the memory comprising computer executable instructions that, when executed by the processor, perform a method comprising:
      requesting access to electronic content associated with physical media, wherein the physical media is not comprised by the first video gaming device;
      querying a local network of the first video gaming device to identify a second video gaming device on the local network capable of validating ownership of the electronic content;
      receiving, at the first video gaming device and from the second video gaming device via the local network, a validation data object of the ownership of the electronic content; and
      using, by the first device, the validation data object to access the electronic content.

* * * * *